US009388757B2

(12) United States Patent
Onoe et al.

(10) Patent No.: US 9,388,757 B2
(45) Date of Patent: Jul. 12, 2016

(54) EXHAUST GAS PURIFICATION APPARATUS

(71) Applicant: TOYOTA JIDOSHA KABUSHIKI KAISHA, Toyota-shi, Aichi (JP)

(72) Inventors: Ryota Onoe, Toyota (JP); Oji Kuno, Toyota (JP); Yuki Aoki, Toyota (JP); Nobusuke Kabashima, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 32 days.

(21) Appl. No.: 14/367,244

(22) PCT Filed: Dec. 21, 2012

(86) PCT No.: PCT/JP2012/008212
§ 371 (c)(1),
(2) Date: Jun. 20, 2014

(87) PCT Pub. No.: WO2013/094220
PCT Pub. Date: Jun. 27, 2013

(65) Prior Publication Data
US 2015/0252744 A1 Sep. 10, 2015

(30) Foreign Application Priority Data

Dec. 22, 2011 (JP) ................. 2011-281079

(51) Int. Cl.
*B01J 35/00* (2006.01)
*F02D 41/02* (2006.01)
(Continued)

(52) U.S. Cl.
CPC ........ *F02D 41/0295* (2013.01); *B01D 53/9454* (2013.01); *B01D 53/9495* (2013.01); *B01J 23/63* (2013.01); *B01J 35/002* (2013.01); *B01J 35/04* (2013.01); *B01J 35/1009* (2013.01); *B01J 37/0244* (2013.01); *F01N 3/0864* (2013.01); *F02D 41/1441* (2013.01); *F02D 41/1443* (2013.01); *B01D 53/945* (2013.01);
(Continued)

(58) Field of Classification Search
CPC .......... F01N 3/0864; F01N 2510/0682; F02D 41/0295; F02D 41/1441; F02D 2200/0814; B01D 53/9454; B01D 53/9472; B01D 53/9495; B01D 2255/407; B01J 35/1009
See application file for complete search history.

(56) References Cited

U.S. PATENT DOCUMENTS

2001/0045089 A1* 11/2001 Kobayashi .......... F02D 41/0295
60/274
2003/0050189 A1 3/2003 Morikawa et al.
(Continued)

FOREIGN PATENT DOCUMENTS

JP 2003-73123 3/2003
JP 2011-111922 6/2011
(Continued)

*Primary Examiner* — Jonathan Matthias
(74) *Attorney, Agent, or Firm* — Finnegan, Henderson, Garrett & Dunner, LLP

(57) ABSTRACT

The exhaust gas purification apparatus 100 according to the present invention is provided with an exhaust gas purification catalyst 40, an upstream $O_2$ sensor 14, a downstream $O_2$ sensor 15, and a control section 30 that executes main F/B control and sub-F/B control. This exhaust gas purification apparatus 100 contains, on a support in a prescribed region 45 from a catalyst-outlet-side end 43a at the downstream side of an exhaust gas purification catalyst 40, an OSC material having a pyrochlore structure and an OSC material having an oxygen storage rate that is faster than that of the OSC material having a pyrochlore structure.

6 Claims, 7 Drawing Sheets

(51) Int. Cl.
  *B01J 23/63* (2006.01)
  *F02D 41/14* (2006.01)
  *F01N 3/08* (2006.01)
  *B01J 37/02* (2006.01)
  *B01J 35/04* (2006.01)
  *B01J 35/10* (2006.01)
  *B01D 53/94* (2006.01)
(52) U.S. Cl.
  CPC ....... *B01D53/9472* (2013.01); *B01D 2255/102* (2013.01); *B01D 2255/1023* (2013.01); *B01D 2255/206* (2013.01); *B01D 2255/407* (2013.01); *F01N 2510/0682* (2013.01); *F02D 2200/0814* (2013.01); *Y02T 10/20* (2013.01); *Y02T 10/22* (2013.01)

(56) References Cited

U.S. PATENT DOCUMENTS

2010/0061903 A1  3/2010  Kohara et al.
2012/0021899 A1  1/2012  Nobukawa et al.

FOREIGN PATENT DOCUMENTS

| JP | 2011-167631 | 9/2011 |
| JP | 2011-212641 | 10/2011 |
| JP | 2012-24701 | 2/2012 |
| JP | 2012-110859 | 6/2012 |
| WO | WO 2008/093471 A1 | 8/2008 |

* cited by examiner

EXHAUST GAS PURIFICATION APPARATUS

The present invention relates to an exhaust gas purification apparatus. More particularly, the present invention relates to an exhaust gas purification apparatus that is provided with an exhaust gas purification catalyst that contains, as a support, an inorganic material having an oxygen storage capacity (i.e., an OSC material).

This application is a national phase application of International Application No. PCT/JP2012/008212, filed Dec. 21, 2012, and claims priority from Japanese Patent Application No. 2011-281079 filed on Dec. 22, 2011, and the entire contents of both of those applications are incorporated herein by reference.

TECHNICAL FIELD

The present invention relates to an exhaust gas purification apparatus. More particularly, the present invention relates to an exhaust gas purification apparatus that is provided with an exhaust gas purification catalyst that contains, as a support, an inorganic material having an oxygen storage capacity (i.e., an OSC material).

This international application claims priority from Japanese Patent Application No. 2011-281079 filed on Dec. 22, 2011, and the entire contents of which are incorporated herein by reference.

BACKGROUND ART

The exhaust gas discharged from an internal combustion engine in, e.g., an automobile, contains pollutant components such as carbon monoxide (CO), hydrocarbon (HC), and nitrogen oxides ($NO_x$). In order to remove these pollutant components from the exhaust gas, an exhaust gas purification apparatus equipped with an exhaust gas purification catalyst is disposed in the exhaust path of the internal combustion engine. A three-way catalyst, which simultaneously performs oxidation of the CO and HC and reduction of the $NO_x$, is preferably used for this exhaust gas purification catalyst. A widely known three-way catalyst here generally has a precious metal catalyst, e.g., platinum (Pt), rhodium (Rh), palladium (Pd) supported on a porous support made of a metal oxide such as alumina ($Al_2O_3$), and exhibits a high catalytic capacity in particular for the exhaust gas produced when an air-fuel mixture in the neighborhood of the theoretical air/fuel ratio (stoichiometry: A/F=14.7) is fed to the internal combustion engine.

However, it is difficult to continuously maintain the air/fuel ratio of the air-fuel mixture actually fed to an internal combustion engine in the neighborhood of stoichiometry, and depending on, for example, the running conditions for the automobile, the air/fuel ratio of the air-fuel mixture may assume a fuel excess condition (rich: A/F<14.7) or an oxygen excess condition (lean: A/F>14.7). As a consequence, in recent years the support has included an inorganic material that has an oxygen storage capacity (OSC), i.e., an OSC material. This OSC material absorbs and stores the oxygen in the exhaust gas when the air-fuel mixture has gone lean (this exhaust gas is referred to below as a "lean exhaust gas") and thereby facilitates reduction of the $NO_x$ in the exhaust gas by making the exhaust gas into a reducing atmosphere. On the other hand, the OSC material releases the stored oxygen when an exhaust gas is supplied from an air-fuel mixture that has gone rich (this exhaust gas is referred to below as a "rich exhaust gas"), thereby facilitating oxidation of the CO and HC in the exhaust gas by making the exhaust gas into an oxidizing atmosphere.

Feedback control (F/B control) is also widely used in exhaust gas purification apparatuses. In this F/B control, the oxygen concentration upstream from the exhaust gas purification catalyst (the upstream $O_2$ concentration) is first detected and a first control target value is established based on this upstream $O_2$ concentration and a prescribed target air/fuel ratio (main F/B control). The oxygen concentration downstream from the exhaust gas purification catalyst (the downstream $O_2$ concentration) is also detected and a second control target value is established by correcting, based on this downstream $O_2$ concentration, the first control target value that has been established by the main F/B control (sub-F/B control). In addition, by adjusting the air/fuel ratio of the air-fuel mixture based on this second control target value, an air-fuel mixture can be fed to the internal combustion engine that reflects the air/fuel ratio of the current air-fuel mixture and the status of the exhaust gas purification catalyst. By adjusting the air/fuel ratio of the air-fuel mixture to an appropriate condition, such F/B control contributes to improving fuel consumption and improving the efficiency of purification of the pollutant components in the exhaust gas.

However, a certain time lag (control lag) can be produced in air/fuel ratio control of the air-fuel mixture by the F/B control described in the preceding, and exhaust gas from an unsuitable air/fuel ratio will continue to be fed to the exhaust gas purification catalyst in the time interval that this control lag produces. In this case, the exhaust gas purification function due to the exhaust gas purification catalyst does not operate properly and emissions are then produced in which pollutants in the exhaust gas are discharged to the outside.

Considered broadly, this control lag is composed of a "transport lag" and a "response lag". The "transport lag" refers to the time lag after the second control target value for the air-fuel mixture has been set by F/B control until the an air-fuel mixture that reflects this second control target value is combusted in the internal combustion engine and converted to exhaust gas and reaches the exhaust gas purification catalyst. The "response lag", on the other hand, refers to the time lag until an exhaust gas comes into contact with the $O_2$ sensors for detecting the upstream $O_2$ concentration and the downstream $O_2$ concentration and the second control target value based on the output of these $O_2$ sensors is established.

The response lag, which is one factor in the control lag as described above, is produced by, for example, a decline in the responsiveness of the downstream $O_2$ sensor that detects the downstream $O_2$ concentration. A typical oxygen sensor can exhibit a high responsiveness when oxygen is present to the extent that oxygen is at the periphery of the sensor element, but the responsiveness deteriorates when oxygen is not present at the periphery of the sensor element. Due to this, when excess rich exhaust gas is continuously fed to the downstream $O_2$ sensor, a state is reached in which there is almost no oxygen at the periphery of the sensor element, and the responsiveness is then diminished when a lean exhaust gas subsequently begins to be supplied. Subsequent to this, even when the target air/fuel ratio is adjusted to the lean side and an exhaust gas having a high oxygen concentration is supplied to the downstream $O_2$ sensor, a correct value for the existing downstream $O_2$ concentration cannot be detected; the correction for the second control target value by the previously described sub-F/B control is then not appropriately performed for some period of time; and the aforementioned response lag is produced.

A control apparatus for suppressing the control lag in the aforementioned F/B control is disclosed in Patent Literature 1. This control apparatus is provided with an exhaust gas purification catalyst that has a lower oxygen storage rate on the side facing the downstream $O_2$ sensor (the downstream region of the exhaust gas purification catalyst has a slower oxygen storage rate than the upstream region) than on the side facing the upstream $O_2$ sensor. Specifically, in the control apparatus described in Patent Literature 1, the oxygen storage rate on the outlet side is slowed down by reducing the amount of precious metal supported in the downstream region of the exhaust gas purification catalyst and/or by reducing the Zr compositional ratio in the OSC material in the downstream region. A control apparatus with this structure can stop the feed of excess rich exhaust gas to the downstream $O_2$ sensor because, even when the amount of oxygen storage by the OSC material in the upstream region declines, small amounts of oxygen continue to be released from the downstream region OSC material with its slower oxygen storage rate. As a consequence, the response lag due to the impaired responsiveness of the downstream $O_2$ sensor as described above can be suppressed. In addition, other art related to exhaust gas purification catalysts is disclosed in Patent Literature 2 and 3.

CITATION LIST

Patent Literature

[PTL 1]
Japanese Patent Application Laid-open No. 2011-111922
[PTL 2]
WO 2008/093471
[PTL 3]
Japanese Patent Application Laid-open No. 2011-167631

The exhaust gas purification apparatus described in Patent Literature 1 can certainly stop the decline in the responsiveness of the downstream $O_2$ sensor and can favorably prevent the pollutant component emission that is due to control lag. However, the present inventor, as a result of various investigations on improvements to the invention described in Patent Literature 1, discovered a new problem that has not been considered up to now.

Generally, the flow rate of the exhaust gas discharged from an internal combustion engine is not always constant and undergoes corresponding fluctuations. Accordingly, during the operation of an internal combustion engine, there will be instances in which a large flow rate occurs and an exhaust gas with a fast flow velocity will be discharged. When this large flow rate exhaust gas is fed to the exhaust gas purification catalyst, the pollutant components cannot be suitably purified at just the upstream region of the exhaust gas purification catalyst and the pollutant components may reach the downstream region of the exhaust gas purification catalyst. In the invention described in Patent Literature 1, a slower oxygen storage rate is established on the side facing the downstream $O_2$ sensor (the downstream region of the exhaust gas purification catalyst) in order to eliminate the decline in the responsiveness of the downstream $O_2$ sensor. As a consequence, when a high flow rate exhaust gas is supplied and pollutant components reach the downstream region, it cannot catch up with the speed of the supplied exhaust gas at the oxygen storage rate of the downstream region and pollutant components may be emitted.

SUMMARY OF INVENTION

The present invention was created in order to solve the problem identified above and takes as an object the introduction of an exhaust gas purification apparatus that, in addition to preventing the control lag in F/B control, can favorably prevent the emission of pollutant components when a high flow rate exhaust gas is supplied.

In order to realize this object, the present invention provides an exhaust gas purification apparatus that has the structure described in the following. That is, the exhaust gas purification apparatus according to the present invention is an exhaust gas purification apparatus that is disposed in the exhaust system of an internal combustion engine and that purifies the exhaust gas. This exhaust gas purification apparatus is provided with an exhaust gas purification catalyst, an upstream $O_2$ sensor, and a downstream $O_2$ sensor. The exhaust gas purification catalyst is disposed in the exhaust system and has a catalyst layer formed on a substrate and including a support containing an OSC material having an oxygen storage capacity and a precious metal catalyst supported on this support. The upstream $O_2$ sensor is disposed in the exhaust system upstream from the exhaust gas purification catalyst and detects an upstream $O_2$ concentration, which is an oxygen concentration in the exhaust gas on the upstream side of the exhaust gas purification catalyst. The downstream $O_2$ sensor is disposed in the exhaust system downstream from the exhaust gas purification catalyst and detects a downstream $O_2$ concentration, which is an oxygen concentration in the exhaust gas on the downstream side of the exhaust gas purification catalyst. In addition, the control section of the herein disclosed exhaust gas purification apparatus is configured to be capable of executing main feedback control (main F/B control), sub-feedback control (sub-F/B control), and air/fuel ratio adjustment control. This main F/B control calculates the current air/fuel ratio for the air-fuel mixture being supplied to the internal combustion engine based on the upstream $O_2$ concentration and sets a first control target value based on the calculated current air/fuel ratio and a predetermined target air/fuel ratio. The sub-F/B control sets a second control target value by correcting the first control target value based on the downstream $O_2$ concentration. The air/fuel ratio adjustment control adjusts the air/fuel ratio of the air-fuel mixture supplied to the internal combustion engine based on this second control target value.

In addition, the herein disclosed exhaust gas purification apparatus contains, on the support in a prescribed region from a catalyst-outlet-side end at the downstream side of the exhaust gas purification catalyst (preferably in the region adjacent to the catalyst-outlet-side end), an OSC material having a pyrochlore structure and an OSC material having an oxygen storage rate that is faster than that of the OSC material having a pyrochlore structure.

In this Description, a "rich air/fuel ratio exhaust gas" refers to an exhaust gas that has the same air/fuel ratio as the air/fuel ratio for the exhaust gas discharged when an air-fuel mixture having a rich air/fuel ratio (A/F<14.7) is combusted in an internal combustion engine. Similarly, a "stoichiometric air/fuel ratio exhaust gas" refers to an exhaust gas that has the same air/fuel ratio as the air/fuel ratio for the exhaust gas discharged when an air-fuel mixture having a stoichiometric air/fuel ratio is combusted, and a "lean air/fuel ratio exhaust gas" refers to an exhaust gas that has the same air/fuel ratio as the air/fuel ratio for the exhaust gas discharged when an air-fuel mixture having a lean air/fuel ratio is combusted. This is a technical matter that can be clearly and easily understood by the individual skilled in the art. For the sake of convenience in the description, as appropriate "rich air/fuel ratio exhaust gas" is abbreviated as "rich exhaust gas", "stoichiometric air/fuel ratio exhaust gas" is abbreviated as "stoichiometric exhaust gas", and "lean air/fuel ratio exhaust gas" is abbreviated as "lean exhaust gas" in this Description.

In the herein disclosed exhaust gas purification apparatus, an OSC material having a pyrochlore structure is present on the support in a prescribed region from the catalyst-outlet-side end at the downstream side of the exhaust gas purification catalyst. A characteristic feature of an OSC material having a pyrochlore structure is that its oxygen storage rate is slower than that of OSC materials that have other crystalline structures. Accordingly, in the exhaust gas purification catalyst of the herein disclosed exhaust gas purification apparatus, due to the presence of an OSC material having a slow oxygen storage rate on the support in a prescribed region from the catalyst-outlet-side end at the downstream side of the exhaust gas purification catalyst, a small amount of oxygen can continue to be released from this prescribed region even when excess rich exhaust gas is continuously supplied and the amount of oxygen storage in the upstream region of the exhaust gas purification catalyst reaches low levels. As a consequence of this, the downstream $O_2$ sensor is protected from exposure to excess rich exhaust gas, and as a result the decline in downstream $O_2$ sensor responsiveness is suppressed and the control lag in F/B control can be favorably prevented.

In the herein disclosed exhaust gas purification apparatus, an OSC material having a faster oxygen storage rate than the aforementioned OSC material having a pyrochlore structure is also present on the support in a prescribed region from the catalyst-outlet-side end at the downstream side of the exhaust gas purification catalyst. That is, in the herein disclosed exhaust gas purification apparatus, an OSC material having a pyrochlore structure and an OSC material having a faster oxygen storage rate than the OSC material having a pyrochlore structure are both present on the support in the prescribed region. Due to this, an oxygen storage capacity having an appropriate rate can be exhibited even by the aforementioned prescribed region containing the above-described OSC material having a relatively slow oxygen storage rate. Accordingly, even when a large flow rate exhaust gas is supplied to the exhaust gas purification catalyst and unpurified pollutant components do reach this prescribed region of the exhaust gas purification catalyst, the emission of the pollutant components can be prevented because these unpurified pollutant components can be purified in this prescribed region.

When, as in the conventional art, the oxygen storage rate of the catalyst layer is slowed down by adjusting the ratio of the elements making up the OSC material or by adjusting the amount of supported precious metal, it is difficult to place both an OSC material having a slow oxygen storage rate (low-rate OSC material) and an OSC material having a fast oxygen storage rate (high-rate OSC material) in the same region of the catalyst layer of the exhaust gas purification apparatus, as in the present invention. However, because in the present invention the low-rate OSC material and high-rate OSC material are obtained based on differences in the crystalline structures of the OSC materials and not, for example, based on the compositional ratio of the materials of the catalyst layer, the present invention makes it possible for a low-rate OSC material and a high-rate OSC material to both be present in the aforementioned prescribed region.

Because, as indicated above, in accordance with the herein disclosed exhaust gas purification apparatus an OSC material having a pyrochlore structure and an OSC material having a faster oxygen storage rate than this OSC material having a pyrochlore structure are both present in a prescribed region from the catalyst-outlet-side end at the downstream side of the exhaust gas purification catalyst, the emission of pollutant components can be favorably prevented when a high flow rate exhaust gas is supplied, in addition to the elimination of the control lag in the F/B control that is due to a reduced responsiveness by the downstream $O_2$ sensor.

In a preferred aspect of the herein disclosed exhaust gas purification apparatus, the crystalline structure of the OSC material having a faster oxygen storage rate than the OSC material having a pyrochlore structure is a fluorite structure.

Since the OSC material having a fluorite structure has a fast oxygen storage rate, a region that incorporates a support containing an OSC material with such a crystalline structure is well suited for the purification of the pollutant components in exhaust gas. Accordingly, since the exhaust gas purification apparatus with the above-described structure contains OSC material having this crystalline structure in the support in a prescribed region from the catalyst-outlet-side end at the downstream side of the exhaust gas purification catalyst, the emission of pollutant components can be even more favorably prevented when a high flow rate exhaust gas is supplied.

In a preferred aspect of the herein disclosed exhaust gas purification apparatus, the value $I_{14/29}$ obtained by dividing the intensity $I_{14}$ of the peak in the vicinity of
[Math. 1]

$$2\theta/\theta = 14°$$

by the intensity $I_{29}$ of the peak in the vicinity of
[Math. 2]

$$2\theta/\theta = 29°$$

in an X-ray diffraction analysis of the support in the previously described prescribed region from the catalyst-outlet-side end is at least 0.005.

The peak intensity $I_{14}$ in the vicinity of
[Math. 3]

$$2\theta/\theta = 14°$$

originates with the pyrochlore structure, while the peak intensity $I_{29}$ in the vicinity of
[Math. 4]

$$2\theta/\theta = 29°$$

originates with other crystalline structures. Accordingly, the content in the prescribed region of the OSC material having a pyrochlore structure can be elucidated by determining the value $I_{14/29}$ obtained by dividing the peak intensity $I_{14}$ by the peak intensity $I_{29}$. The value ($I_{14/29}$) is at least 0.005 in the exhaust gas purification apparatus having the above-described structure. In this case, the decline in the responsiveness of the downstream $O_2$ sensor can be even more favorably prevented because the OSC material having a pyrochlore structure is present in a suitable proportion. $I_{14/29}$ is preferably at least 0.02 and is more preferably at least 0.04. When the value ($I_{14/29}$) is in the indicated numerical value range, the prevention of the decline in downstream $O_2$ sensor responsiveness can be made to coexist even better with the prevention of pollutant component emission when a large flow rate exhaust gas is supplied.

In a preferred aspect of the herein described exhaust gas purification apparatus, the length, in the exhaust gas flow direction, of the prescribed region from the catalyst-outlet-side end is from 10% to 50% of the total length of the catalyst layer of the exhaust gas purification catalyst.

When the length of this prescribed region is too short, a small amount of oxygen is released from the prescribed region and the ability to prevent the supply of excess rich exhaust gas to the downstream $O_2$ sensor is then impaired. Thus, when the length of the region containing the OSC material having a pyrochlore structure is in the indicated numerical value range, the emission of pollutant components when a large flow rate exhaust gas is supplied can be favorably prevented, in addition to an excellent prevention of the reduction in downstream $O_2$ sensor responsiveness.

In a preferred aspect of the herein disclosed exhaust gas purification apparatus, the downstream $O_2$ sensor is a ceramic oxygen sensor in which an intermediate layer formed of an oxide conductor is sandwiched between a measurement electrode and a reference electrode and in which a porous coating layer made of a metal oxide is formed on the measurement electrode.

In a ceramic oxygen sensor with this structure, an output is produced by the difference between the concentration of the oxygen held in the porous coating layer and the oxygen concentration in the atmosphere. In a ceramic oxygen sensor having this structure, the oxygen concentration in the coating layer and the oxygen concentration in the exhaust gas that has been purified by the exhaust gas purification catalyst (residual oxygen concentration) are desirably the same. In actuality, however, the oxygen concentration in the coating layer changes after the change in this residual oxygen concentration. For example, when a state in which the oxygen in the coating layer has been depleted and a state in which a certain level of oxygen remains present in the coating layer are compared, the oxygen concentration in the coating layer more rapidly approximates the residual oxygen concentration in the case of the state in which oxygen remains in the coating layer. In the herein disclosed exhaust gas purification apparatus, the feed of excess rich exhaust gas to the downstream $O_2$ sensor can be prevented by the OSC material having a pyrochlore structure that is present in the support in a prescribed region from the catalyst-outlet-side end at the downstream side of the exhaust gas purification catalyst, and as a consequence oxygen depletion in the coating layer can be prevented and an improvement can be obtained in the ability of the oxygen concentration to follow the residual oxygen concentration when a lean exhaust gas is fed to the ceramic oxygen sensor with the above-described structure (i.e., in the lean responsiveness).

In a preferred aspect of the herein disclosed exhaust gas purification apparatus, the specific surface area based on the BET method of the OSC material having a pyrochlore structure is not more than 10 $m^2/g$.

In the exhaust gas purification apparatus with this structure, the specific surface area of the OSC material having a pyrochlore structure, which is the low-rate OSC material, is not more than 10 $m^2/g$ and the oxygen storage rate of this low-rate OSC material is slowed down even further. As a consequence, an even better prevention of the decline in the downstream $O_2$ sensor responsiveness can be obtained. In addition, the specific surface area of an OSC material having a pyrochlore structure is easily brought to 10 $m^2/g$ or less.

In a preferred aspect of the herein disclosed exhaust gas purification apparatus, both the OSC material having a pyrochlore structure and the OSC material having a faster oxygen storage rate than the OSC material having a pyrochlore structure are a ceria-zirconia complex oxide.

Ceria-zirconia complex oxides have a high oxygen storage capacity and are relatively inexpensive and as a result are preferred for use as OSC materials. In addition, since in the herein disclosed exhaust gas purification apparatus the difference in the oxygen storage rate is established by a difference in crystalline structure, the same material can be used for both the low-rate OSC material and the high-rate OSC material. Production of the exhaust gas purification catalyst can be carried out more easily as a result.

In a preferred aspect of the herein disclosed exhaust gas purification apparatus, the control section is configured to be able in the sub-feedback control to set the second control target value by adjusting the target air/fuel ratio based on the downstream $O_2$ concentration and correcting the first control target value by comparing this post-adjustment target air/fuel ratio with the first control target value.

In the exhaust gas purification apparatus with this structure, the target air/fuel ratio, which provides the index for air/fuel ratio adjustment of the air-fuel mixture, is adjusted based on the $O_2$ concentration (the downstream $O_2$ concentration) in the exhaust gas of which oxygen concentration has been changed by passage through the exhaust gas purification catalyst. Thus, because the current oxygen storage capacity of the exhaust gas purification catalyst is reflected in the target air/fuel ratio, a better state can be maintained in the exhaust gas purification catalyst for the purification function for the pollutant components.

The exhaust gas purification apparatus with the structure described in the preceding can provide an excellent prevention of the control lag caused by a decline in the responsiveness of the downstream $O_2$ sensor and can provide an excellent prevention of pollutant component emission when a fast flow velocity exhaust gas is supplied. Thus, the exhaust gas purification apparatus with the structure described in the preceding, because it can substantially reduce the emission of pollutant components, is well suited for use in vehicles (for example, automobiles) that discharge an exhaust gas while running.

BRIEF DESCRIPTION OF DRAWINGS

FIG. 6 is a diagram that schematically shows the concentration of the oxygen being held in the coating layer of the downstream $O_2$ sensor, wherein FIG. 6(A) shows the case for the use of an OSC material having a pyrochlore structure in the exhaust gas purification catalyst and FIG. 6(B) shows the case for the use of an OSC material having a fluorite structure in the exhaust gas purification catalyst.

DESCRIPTION OF EMBODIMENTS

Preferred embodiments of the present invention are described in the following. Matters required for the execution of the present invention, but not included in the matters particularly described in this Description, can be understood as design matters for the individual skilled in the art based on the conventional art in the pertinent field. The present invention can be executed based on the contents disclosed in this Description and the common general technical knowledge in the pertinent field.

<The Exhaust Gas Purification Apparatus>

Figure 1:
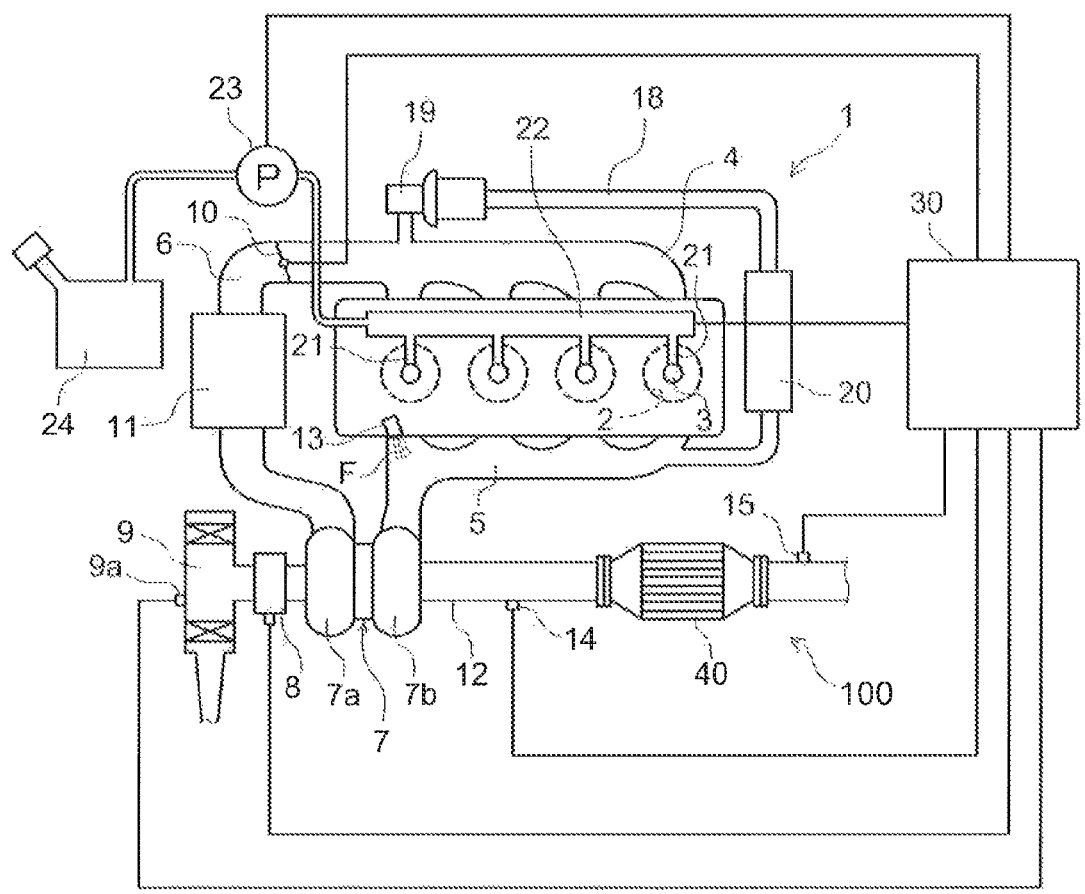
FIG. 1 is a diagram that schematically shows an exhaust gas purification apparatus according to an embodiment of the present invention.

The structure of an exhaust gas purification apparatus according to an embodiment of the present invention will be described first. The herein disclosed exhaust gas purification apparatus is disposed in the exhaust system of an internal combustion engine. The internal combustion engine and the exhaust gas purification apparatus are described in the following with reference to FIG. 1. FIG. 1 is a diagram that schematically shows an internal combustion engine 1 and an exhaust gas purification apparatus 100 disposed in the exhaust system of this internal combustion engine 1.

A. The Internal Combustion Engine

An air-fuel mixture containing oxygen and a fuel gas is supplied to the internal combustion engine. The internal combustion engine carries out combustion of this air-fuel mixture and converts the energy of combustion into mechanical energy. The air-fuel mixture combusted when this is done is converted into an exhaust gas and is discharged into the exhaust system, infra. The internal combustion engine 1 with the structure shown in FIG. 1 is provided with a plurality of combustion chambers 2 and a fuel injection valve 3 that injects fuel into each combustion chamber 2. Each fuel injection valve 3 is connected through a fuel feed line 21 to a common rail 22. The common rail 22 is connected through a fuel pump 23 to a fuel tank 24. The fuel pump 23 feeds the fuel in the fuel tank 24 through the common rail 22, the fuel feed line 21, and the fuel injection valve 3 into a combustion chamber 2. The structure of the fuel pump 23 does not particularly limit the present invention, and, for example, a variable-displacement, electronically controlled fuel pump may be used.

An intake manifold 4 and an exhaust manifold 5 each communicate with a combustion chamber 2. In the description that follows, the system that feeds air (oxygen) to the internal combustion engine 1 and that is disposed on the upstream side from the intake manifold 4 is referred to as the "intake system", while the system that discharges the exhaust gas produced by the internal combustion engine 1 to the outside and that is disposed on the downstream side from the exhaust manifold 5 is referred to as the "exhaust system". This intake system and exhaust system are in communication with each other through an exhaust gas recirculation line 18 and the exhaust gas discharged into the exhaust system can also be re-supplied to a combustion chamber 2. An electronically controlled control valve 19 is disposed in the exhaust gas recirculation line 18, and the amount of recirculated exhaust gas can be adjusted by the operation of this control valve 19. A cooling device 20 for cooling the gas flowing in the exhaust gas recirculation line 18 is disposed on the circumference of the exhaust gas recirculation line 18.

A-1. The Intake System

The intake system of the internal combustion engine 1 will now be described. An intake duct 6 is connected to the intake manifold 4 that connects the internal combustion engine 1 to the intake system. This intake duct 6 is connected to a compressor 7a of an exhaust turbocharger 7, and an air cleaner 9 is connected to the compressor 7a. An intake temperature sensor 9a, which detects the temperature (intake temperature) of the air suctioned in from outside the internal combustion engine, is mounted in the air cleaner 9. An air flow meter 8 is disposed downstream (on the side of the internal combustion engine 1) from the air cleaner 9. The air flow meter 8 is a sensor that detects the air intake amount Ga supplied to the intake duct 6. A throttle valve 10 is disposed in the intake duct 6 further downstream from the air flow meter 8. The amount of air supplied to the internal combustion engine 1 can be adjusted by the operation of this throttle valve 10. A throttle sensor (omitted from the diagram), which detects the aperture of the throttle valve 10, is desirably disposed in proximity to the throttle valve 10. A cooler 11 for cooling the air flowing in the intake duct 6 is preferably disposed on the circumference of the intake duct 6.

A-2. The Exhaust System

The exhaust system in the internal combustion engine 1 will now be described. The exhaust manifold 5, which connects the internal combustion engine 1 to the exhaust system, is connected to an exhaust turbine 7b of the exhaust turbocharger 7. An exhaust passage 12, through which the exhaust gas flows, is connected to this exhaust turbine 7b. An exhaust system fuel injection valve 13, which injects fuel F into the exhaust gas, may be disposed in the exhaust system (for example, in the exhaust manifold 5). By injecting fuel F into the exhaust gas, this exhaust system fuel injection valve 13 can adjust the air/fuel ratio (A/F) of the exhaust gas that is supplied to the exhaust gas purification catalyst 40, infra.

B. The Exhaust Gas Purification Apparatus

The herein disclosed exhaust gas purification apparatus is disposed in the exhaust system of the above-described internal combustion engine. This exhaust gas purification apparatus is provided with an exhaust gas purification catalyst, an upstream $O_2$ sensor, a downstream $O_2$ sensor, and a control section and carries out the purification of pollutant components (for example, carbon monoxide (CO), hydrocarbon (HC), nitrogen oxides ($NO_x$)) present in the exhaust gas discharged from the internal combustion engine. Each structure in the herein disclosed exhaust gas purification apparatus is described below.

C. The Exhaust Gas Purification Catalyst

The exhaust gas purification catalyst is disposed in the exhaust system of the above-described internal combustion engine. In the exhaust gas purification apparatus 100 with the structure shown in FIG. 1, the exhaust gas purification catalyst 40 is disposed in the exhaust passage 12 that is a constituent of the exhaust system of the internal combustion engine 1, and the exhaust gas produced by the internal combustion engine 1 and flowing into the exhaust passage 12 via the exhaust manifold 5 is supplied to the exhaust gas purification catalyst 40.

The exhaust gas purification catalyst is constructed by forming a catalyst layer on a substrate. The catalyst layer of the exhaust gas purification catalyst includes a support that contains an OSC material having an oxygen storage capacity and a precious metal catalyst supported on this support, and the pollutant components in the exhaust gas are purified by the catalytic function of this catalyst layer.

Figure 2:
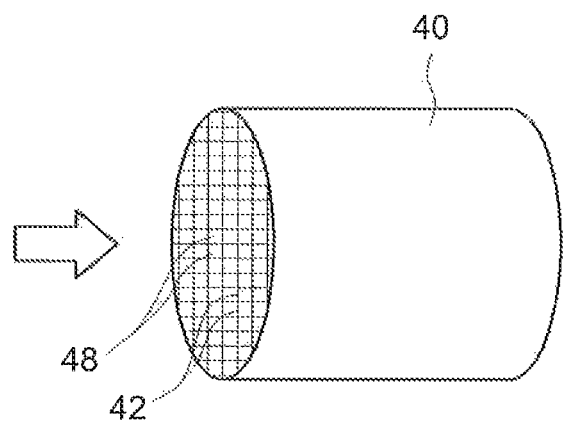
FIG. 2 is a diagram that schematically shows the exhaust gas purification catalyst in an exhaust gas purification apparatus according to an embodiment of the present invention.
Figure 3:
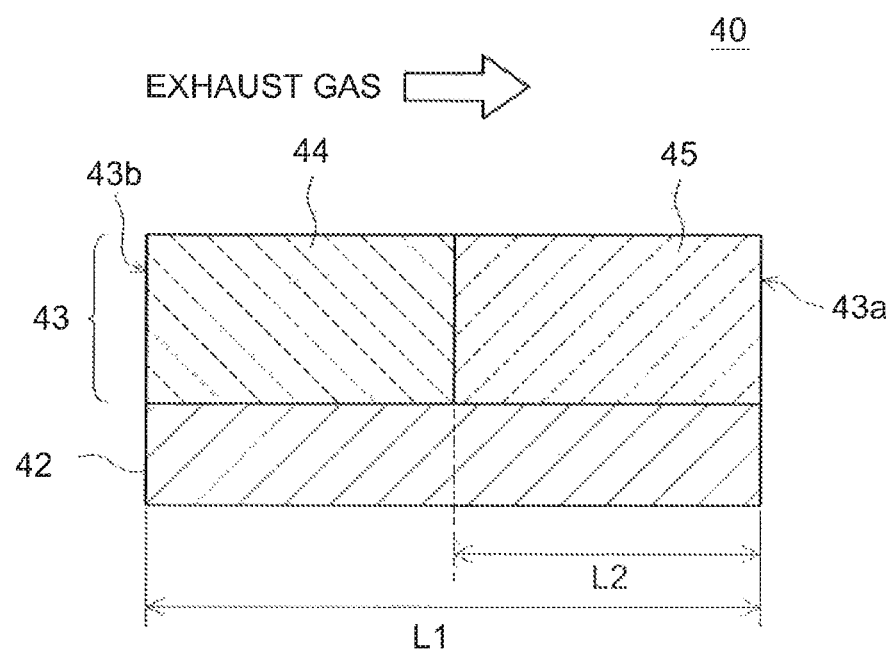
FIG. 3 is a diagram that schematically shows an enlarged cross-sectional structure of an exhaust gas purification catalyst in an exhaust gas purification apparatus according to an embodiment of the present invention.

This exhaust gas purification catalyst will be particularly described with reference to FIGS. 2 and 3. FIG. 2 is a perspective diagram that schematically shows the exhaust gas purification catalyst 40, while FIG. 3 is an enlarged diagram that schematically shows an example of the cross-sectional structure of the exhaust gas purification catalyst 40.

C-1. The Substrate

The substrates heretofore known for exhaust gas purification catalysts can be used for the substrate for the exhaust gas purification catalyst. For example, the substrate is preferably constituted of a heat-resistant material that has a porous structure. This heat-resistant material can be exemplified by cordierite, silicon carbide (SiC), aluminum titanate, and silicon nitride, and by heat-resistant metals and their alloys, e.g., stainless steel. The substrate preferably has, for example, a honeycomb structure, a foam configuration, or a pellet configuration. A cylindrical shape, elliptical cylindrical shape, polyhedral shape, and so forth, may be used for the outer shape of the substrate as a whole. A cylindrical member having a honeycomb structure is used as the substrate 42 for the exhaust gas purification catalyst 40 with the structure shown in FIG. 2. This honeycomb-structured substrate 42 has a plurality of flow passages 48 running along the axial direction of the cylinder (the direction of the arrow in FIG. 2), which is the direction in which the exhaust gas flows. In addition, the capacity of the substrate 42 (the volume of the flow passages 48) is desirably at least 0.1 L (preferably at least 0.5 L) and not more than 5 L (preferably not more than 3 L and more preferably not more than 2 L).

C-2. The Catalyst Layer

The catalyst layer of the exhaust gas purification catalyst is formed on the aforementioned substrate. This catalyst layer contains a support that contains an OSC material having an oxygen storage capacity, and, supported on this support, a precious metal catalyst. A catalyst layer 43 is formed on the surface of the substrate 42 in the exhaust gas purification catalyst 40 with the structure shown in FIG. 3. The pollutant components are purified by contact with the catalyst layer 43 when the exhaust gas supplied to the exhaust gas purification catalyst 40 flows within the flow passages 48 of the substrate 42. For example, the CO and HC present in the exhaust gas are oxidized by the catalytic function of the catalyst layer 43 and converted (purified) into water ($H_2O$) and carbon dioxide ($CO_2$), while the $NO_x$ is reduced by the catalytic function of the catalyst layer 43 and converted (purified) into nitrogen ($N_2$).

The total length L1 of this catalyst layer 43 is desirably 2 cm to 30 cm (preferably 5 cm to 15 cm and more preferably about 10 cm). When the total length of the catalyst layer 43 is too short, this works against a thorough purification of the pollutant components in the exhaust gas when a large flow rate exhaust gas is fed to the exhaust gas purification catalyst 40. When the total length of the exhaust gas purification catalyst 40 is too long, this is disadvantageous due to the steep rise in production costs and the reduced freedom in terms of device design.

C-2-1. The Support

The support present in the catalyst layer is constituted of an OSC material and a support material other than this OSC material. Specifically, the support for the herein disclosed exhaust gas purification catalyst is formed by placing an OSC material, infra, on a support material other than an OSC material. A porous and highly heat-resistant metal oxide is preferably used for this non-OSC material support material. For example, aluminum oxide (alumina: $Al_2O_3$), zirconium oxide (zirconia: $ZrO_2$), silicon oxide (silica: $SiO_2$), and complex oxides in which these metal oxides are the main component are preferred. Among the preceding, the use of alumina and zirconia is particularly preferred because they are inexpensive and satisfy preferred specifications for the support material.

C-2-2. The OSC Material

As indicated above, an OSC material is present in the support in the herein disclosed exhaust gas purification catalyst. An OSC material is an inorganic material that has an oxygen storage capacity, and it takes in and stores oxygen when a lean exhaust gas is supplied and releases this stored oxygen when a rich exhaust gas is supplied. OSC materials can be exemplified by cerium oxide (ceria: $CeO_2$) and complex oxides that contain ceria (for example, ceria-zirconia complex oxides (CZ complex oxides)). Among these OSC materials, the use of CZ complex oxides is particularly preferred because they are relatively inexpensive and have a high oxygen storage capacity. The mixing ratio between the ceria and zirconia in the CZ complex oxide is desirably $CeO_2/ZrO_2$=0.65 to 1.5 (preferably 0.75 to 1.3 and more preferably 0.8 to 1.0).

A characteristic feature of the herein disclosed exhaust gas purification apparatus is that an OSC material having a pyrochlore structure and an OSC material having a faster oxygen storage rate than this pyrochlore-structured OSC material are present in the support in a prescribed region from the catalyst-outlet-side end at the downstream side of the exhaust gas purification catalyst. More specifically, this prescribed region is desirably a region that has a prescribed length in the direction toward the end on the catalyst inlet side from the catalyst-outlet-side end (for example, 5% to 80% (preferably 30% to 70% and more preferably about 50%)) of the total length of the exhaust gas purification catalyst. Or, a prescribed region containing the aforementioned OSC material having a pyrochlore structure may be disposed over the entire area of the catalyst layer of the exhaust gas purification catalyst. When the length of this prescribed region is too short, it becomes difficult to thoroughly suppress the decline in downstream $O_2$ sensor responsiveness. Setting the length of the prescribed region as described above makes it possible to provide an excellent prevention of the control lag induced by a diminished responsiveness by the downstream $O_2$ sensor and also makes it possible to favorably prevent the emission of pollutant components when a large flow rate exhaust gas is supplied.

The OSC material having a pyrochlore structure may be uniformly present over the entire area of the prescribed region or may be present in larger amounts or smaller amounts in a portion of the prescribed region. While the prescribed region need not necessarily be located adjacent to the catalyst-outlet-side end, it is more preferably provided in the region that is adjacent to the catalyst-outlet-side end (i.e., the back region of the exhaust gas purification catalyst). In this case, the oxygen released from the OSC material having a pyrochlore structure can better reach the downstream $O_2$ sensor, which results in an even better suppression of the decline in the responsiveness of the downstream $O_2$ sensor.

In the structure in FIG. 3, which illustrates an example of the herein disclosed exhaust gas purification apparatus, the OSC material having a pyrochlore structure is contained in the prescribed region (here, the back region of the exhaust gas purification catalyst) 45 from a catalyst-outlet-side end 43a at the downstream side of the exhaust gas purification catalyst 40. Thus, in the exhaust gas purification apparatus with the structure shown in FIG. 3, the OSC material having a pyrochlore structure, infra, and the OSC material having an oxygen storage rate faster than that of the OSC material having a pyrochlore structure are both present in the back region 45.

OSC material having an oxygen storage rate faster than that of the OSC material having a pyrochlore structure is also present on the support in the region (upstream region) 44 outside the back region 45.

C-2-2-1. The OSC Material Having a Pyrochlore Structure

Figure 5:
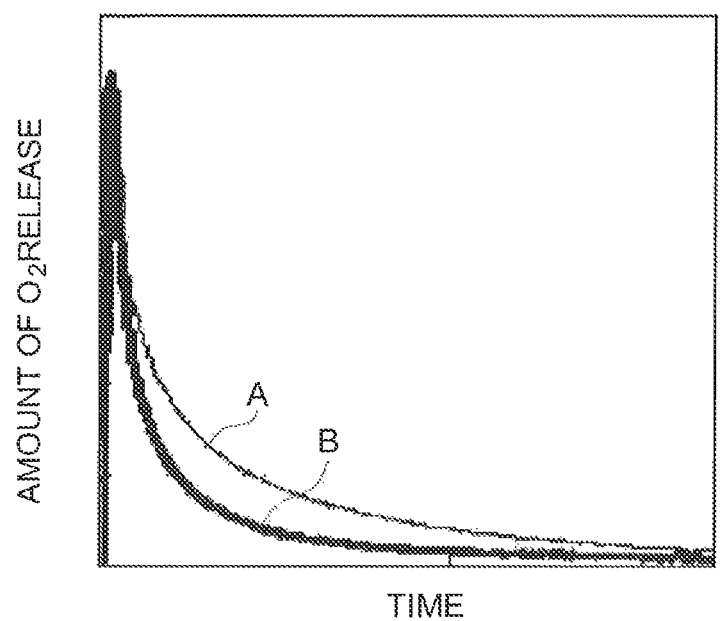
FIG. 5 is a graph that shows the time course of the change in the amount of oxygen release for (A) an OSC material having a pyrochlore structure and (B) an OSC material having a fluorite structure.

The pyrochlore structure is represented by $A_2B_2O_7$ where B is a transition metal element and is a type of crystalline structure composed of the combination $A^{3+}/B^{4+}$ or $A^{2+}/B^{5+}$ and is produced when the ionic radius of the A in the crystalline structure with this composition is relatively small. When a CZ complex oxide is used as the OSC material under consideration, the chemical formula of the OSC material having a pyrochlore structure is represented by $Ce_2Zr_2O_7$ and the Ce and Zr are regularly arranged in alternation with interposed oxygen. As shown in FIG. 5, an OSC material (A) having a pyrochlore structure, when compared with an OSC material (B) having another crystalline structure (for example, a fluorite structure), has a slower oxygen storage rate and can still release oxygen even after the OSC material having another crystalline structure has ceased to release oxygen. Thus, the OSC material having a pyrochlore structure functions as what can be called a reserve OSC material that can exhibit an oxygen storage capacity even after the peak of the oxygen storage by the OSC with another structure has been passed. This is thought to occur because the OSC material having a pyrochlore structure has a more complex crystalline structure and the pathways during oxygen storage are convoluted as a result. More specifically, as shown in FIG. 5, for the OSC material having a pyrochlore structure the total amount of oxygen released in the interval from 10 seconds after the start of oxygen release to 120 seconds after the start of oxygen release is 60% to 95% (preferably 70% to 90% and more preferably 75% to 85%) where 100% is the total amount of oxygen released from immediately after the start of oxygen release (after 0 seconds) to 120 seconds after the start of oxygen release. An excellent suppression of the supply of excess rich exhaust gas to the downstream $O_2$ sensor can be obtained by having such an OSC material with a slow oxygen storage rate be present in the support in a prescribed region from the catalyst-outlet-side end at the downstream side of the exhaust gas purification catalyst.

In addition, the specific surface area of an OSC material having a pyrochlore structure can be more easily reduced than is the case for an OSC material having another crystalline structure. Since a smaller specific surface area for the OSC material provides a further reduction in the oxygen storage rate, this can provide an even better suppression of the decline in downstream $O_2$ sensor responsiveness. The specific surface area (the specific surface area measured by the BET method; this also applies herebelow) of this OSC material having a pyrochlore structure is desirably, for example, not more than 10 $m^2/g$ (preferably at least 0.1 $m^2/g$ but not more than 10 $m^2/g$ and more preferably at least 1 $m^2/g$ but not more than 5 $m^2/g$).

C-2-2-2. The Other OSC Material

As has been previously indicated, in the herein disclosed exhaust gas purification apparatus, an OSC material (referred to below as the "other OSC material" where appropriate) having a faster oxygen storage rate than the OSC material having a pyrochlore structure is present in the catalyst layer of the exhaust gas purification catalyst in the prescribed region that contains the OSC material having a pyrochlore structure and in the region outside this prescribed region (i.e., in almost the entire area of the catalyst layer). The fluorite structure is a specific example of a crystalline structure for this OSC material having the faster oxygen storage rate. An OSC material having a fluorite structure has a faster oxygen storage rate than the OSC material having a pyrochlore structure, as a consequence of which an excellent suppression of pollutant component emission can be obtained even when a large flow rate exhaust gas is supplied. By having this OSC material be present in almost the entire area of the exhaust gas purification catalyst, a thorough purification of the pollutant components can be obtained and emission of the pollutant components can be prevented even when a large flow rate exhaust gas is fed to the exhaust gas purification catalyst.

Unlike the case for the OSC material having a pyrochlore structure, the OSC material having the faster oxygen storage rate preferably has a large specific surface area. Specifically, the specific surface area of the OSC material having the faster oxygen storage rate is desirably at least 20 $m^2/g$ but not more than 80 $m^2/g$ (preferably at least 40 $m^2/g$ but not more than 60 $m^2/g$). This makes it possible to obtain an OSC material having an even faster oxygen storage rate. In order to realize such a specific surface area, the specific form of a preferred OSC material is that of a powder (particulate). The average particle size of such a particulate OSC material is desirably made from at least 5 nm but not more than 20 nm and preferably from at least 7 nm but not more than 12 nm. An excessively small particle size (or an excessively large specific surface area) for this OSC material is disfavored because it lowers the heat resistance of the OSC material itself and reduces the heat-resistance properties of the catalyst. On the other hand, an overly large average particle size (or an excessively small specific surface area) for this OSC material is disfavored because it results in a slower oxygen storage rate.

As has been indicated in the preceding, both an OSC material having a pyrochlore structure and an OSC material having a faster oxygen storage rate than the pyrochlore-structured OSC material are present in the herein disclosed exhaust gas purification apparatus in the support in a prescribed region from the catalyst-outlet-side end at the downstream side of the exhaust gas purification catalyst. The two types of OSC materials that coexist in the prescribed region more preferably are composed of the same complex oxide and differ only in their crystalline structure. In this case, the two types of OSC materials can be favorably dispersed in the support in the prescribed region and as a consequence a further increase in the oxygen storage rate of the OSC material having the faster oxygen storage rate can be brought about. Specifically, the two types of OSC materials coexisting in the prescribed region are preferably both composed of ceria-zirconia complex oxides.

The content of the two types of OSC materials that coexist in the support in the prescribed region can be determined by measurement of the peak intensity in X-ray diffraction analysis. Specifically, when X-ray diffraction analysis is carried out on the constituent materials in the prescribed region, characteristic peaks are seen in the vicinity of

[Math. 5]

$$2\theta/\theta=14°$$

and

[Math. 6]

$$2\theta/\theta=29°$$

Here, the peak in the vicinity of

[Math. 7]

$$2\theta/\theta=14°$$

originates with the pyrochlore structure and the peak in the vicinity of

[Math. 8]

$$2\theta/\theta=29°$$

originates with the other crystalline structure (for example, the fluorite structure). Accordingly, an exhaust gas purification catalyst in which the pyrochlore-structured OSC material and other OSC material coexist in suitable proportions can be obtained by adjusting the value $I_{14/29}$, which is obtained by dividing the intensity of the peak in the vicinity of
[Math. 9]

$$2\theta/\theta=14°$$

by the intensity of the peak in the vicinity of
[Math. 10]

$$2\theta/\theta=29°$$

Specifically, this value $I_{14/29}$ is desirably brought to at least 0.005 (for example, at least 0.005, preferably at least 0.02, and more preferably at least 0.04). By adjusting the value of $I_{14/29}$ into the indicated numerical value range, an exhaust gas purification catalyst is obtained in which the OSC material having a pyrochlore structure is present in a favorable proportion in the prescribed region. The exhaust gas purification apparatus provided with this exhaust gas purification catalyst can provide an excellent suppression of the supply of excess rich exhaust gas to the downstream $O_2$ sensor and can exhibit a favorable oxygen storage rate in the prescribed region. Accordingly, an exhaust gas purification apparatus with this structure can provide an excellent suppression of the control lag in F/B control and of pollutant component emission when a large flow rate exhaust gas is supplied. To bring about an adjustment as described above of the content of the two types of OSC materials in the prescribed region, for example, a content of 0.5 g to 20 g of the OSC material having a pyrochlore structure and 10 g to 100 g of the other OSC material is desirably provided in the prescribed region of 1 L, of capacity of the exhaust gas purification catalyst.

The exhaust gas purification catalyst provided in the exhaust gas purification apparatus of the present invention is not limited to the structure shown in FIG. 3. Specifically, in the exhaust gas purification catalyst 40 shown in FIG. 3, a distinct boundary is provided between the upstream region 44 and the back region 45, which is the prescribed region. However, the exhaust gas purification apparatus of the present invention may also use a structure in which the content of the OSC material having a pyrochlore structure increases in the direction toward the catalyst-outlet-side end 43a. In this case, a distinct boundary between the back region 45 and the upstream region 44 does not exist; however, because the pyrochlore-structured OSC material and the other OSC material do coexist in the prescribed region, an excellent suppression can be obtained of both pollutant component emission when a high flow rate exhaust gas is supplied and the decline in downstream $O_2$ sensor responsiveness.

In the embodiment described in the preceding, the description has concerned an aspect in which two types of OSC materials having different oxygen storage rates coexist in the prescribed region, but this aspect is not a limitation on the invention. For example, two or more types of OSC materials having different oxygen storage rates may be present in the prescribed region as long as an OSC material having a slow oxygen storage rate and an OSC material having a fast oxygen storage rate are present together in the prescribed region.

C-2-3. The Precious Metal Catalyst

A precious metal catalyst is supported on the above-described support. The catalyst metals heretofore known for use as exhaust gas purification catalysts can be used as this precious metal catalyst. Specifically, precious metal particles composed of various precious metal elements can be used for the precious metal catalyst as long as a catalytic function with respect to the pollutant components in the exhaust gas is present. Preferred examples of the metals usable in the precious metal catalyst are any metal in the platinum group and alloys primarily based on any metal in the platinum group. These platinum group metals are platinum (Pt), palladium (Pd), rhodium (Rh), ruthenium (Ru), iridium (Ir), and osmium (Os).

A three-way catalyst containing at least palladium and rhodium is more preferably used for the precious metal catalyst. A three-way catalyst can simultaneously purify the CO, HC, and $NO_x$ in an exhaust gas when a stoichiometric exhaust gas is supplied. In addition, a three-way catalyst can exhibit a high catalytic effect in an exhaust gas purification catalyst that has a high oxygen storage capacity. This three-way catalyst may contain a catalyst metal other than palladium and rhodium (for example, platinum).

C-2-4. Other Additives

Other materials (typically an inorganic oxide) may be added to the catalyst layer as auxiliary materials. Substances that can be added to the catalyst layer can be exemplified by rare-earth elements such as lanthanum (La) and yttrium (Y), alkaline-earth elements such as calcium, and other transition metal elements. Among these, a rare-earth element such as lanthanum and yttrium can improve the specific surface area at high temperatures without poisoning the catalytic functionality and is therefore suitable for use as a stabilizer. In addition, the content of these auxiliary components is more preferably set at 10 mass parts to 20 mass parts (for example, 5 mass parts each for each of lanthanum and yttrium) per 100 mass parts of the OSC material.

The exhaust gas purification catalyst of the herein disclosed exhaust gas purification apparatus has been described in the preceding. The other structures provided in the herein disclosed exhaust gas purification apparatus are described below.

D. The Upstream $O_2$ Sensor

An upstream $O_2$ sensor is disposed upstream from the exhaust gas purification catalyst in the exhaust system in the herein disclosed exhaust gas purification apparatus. In the exhaust gas purification apparatus 100 in the structure shown in FIG. 1, an upstream $O_2$ sensor 14 is disposed upstream from the exhaust gas purification catalyst 40 in the exhaust passage 12.

The upstream $O_2$ sensor detects the upstream $O_2$ concentration, which is the oxygen concentration in the exhaust gas on the upstream side of the exhaust gas purification catalyst. Specifically, the upstream $O_2$ sensor uses a sensor having a structure, for example, that is about the same as that of the downstream $O_2$ sensor, vide infra, and a ceramic oxygen sensor that produces a voltage reflective of the oxygen concentration by contact between an oxygen-containing gas and the sensor element is preferably used for the upstream $O_2$ sensor. In the structure shown in FIG. 1, the upstream $O_2$ sensor 14 is connected via a signal line to a control section 30, vide infra. This upstream $O_2$ sensor 14 produces data on the upstream $O_2$ concentration based on a voltage reflective of the oxygen concentration on the upstream side of the exhaust gas purification catalyst 40, and this data on the upstream $O_2$ concentration is transmitted to the control section 30.

E. The Downstream $O_2$ Sensor

A downstream $O_2$ sensor is disposed downstream from the exhaust gas purification catalyst in the exhaust system in the herein disclosed exhaust gas purification apparatus. In the exhaust gas purification apparatus 100 with the structure shown in FIG. 1, a downstream $O_2$ sensor 15 is disposed downstream from the exhaust gas purification catalyst 40 in the exhaust gas passage 12. The downstream $O_2$ sensor 15 is also connected through a signal line to the control section 30, and the downstream $O_2$ concentration detected by the downstream $O_2$ sensor 15 is converted into a signal and transmitted to the control section 30.

A ceramic oxygen sensor, which is a general sensor for measurement of the oxygen concentration in an exhaust gas, is preferably used for the downstream $O_2$ sensor. An intermediate layer formed of an oxide ionic conductor is sandwiched between the measurement electrode and the reference electrode in this ceramic oxygen sensor. In addition, a porous coating layer made of a metal oxide is formed on the measurement electrode. A ceramic oxygen sensor with this structure produces an output due to the difference between the oxygen concentration of the atmosphere and the concentration of the oxygen held in the porous coating layer. In a ceramic oxygen sensor having the structure under consideration, the oxygen concentration in the coating layer and the oxygen concentration (residual oxygen concentration) in the exhaust gas that has been purified by an exhaust gas purification member (including the catalyst layer 15f when a catalyst layer 15f, infra, is formed in the downstream $O_2$ sensor), e.g., an exhaust gas purification catalyst, are desirably the same. In actuality, however, the oxygen concentration in the coating layer changes after the change in this residual oxygen concentration. For example, when a state in which the oxygen in the coating layer has been depleted and a state in which a certain level of oxygen remains present in the coating layer are compared, the oxygen concentration in the coating layer more rapidly approximates the residual oxygen concentration in the case of the state in which oxygen remains in the coating layer. In the herein disclosed exhaust gas purification apparatus, the feed of excess rich exhaust gas to the downstream $O_2$ sensor can be prevented by the OSC material having a pyrochlore structure that is present in the support in the prescribed region, and as a consequence oxygen depletion in the coating layer can be prevented and an improvement can be obtained in the ability of the oxygen concentration to follow the residual oxygen concentration when a lean exhaust gas is fed to the ceramic oxygen sensor with the above-described structure (i.e., in the lean responsiveness).

Figure 4:
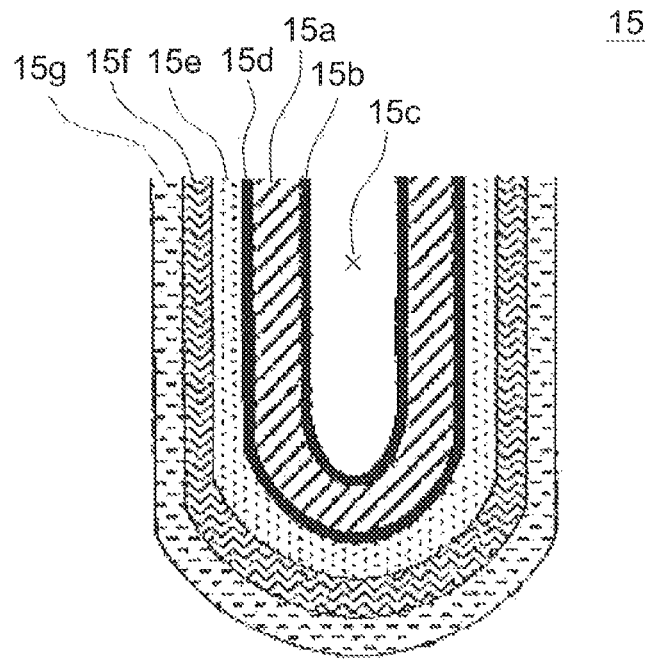
FIG. 4 is a diagram that schematically shows an enlarged cross-sectional structure of the downstream $O_2$ sensor in an exhaust gas purification apparatus according to an embodiment of the present invention.

FIG. 4 shows an example of the structure of the downstream $O_2$ sensor when the above-described ceramic oxygen sensor is used. The downstream $O_2$ sensor 15 with the structure shown in FIG. 4 is provided with an intermediate layer 15a. The intermediate layer 15a is formed of an oxide ionic conductor. This oxide ionic conductor can be exemplified by zirconia (for example, a yttria-stabilized zirconia (YSZ)). In addition, a reference electrode 15b is formed to the interior side of the intermediate layer 15a, and oxygen gas at a prescribed concentration is filled into an internal volume 15c formed to the inner side of the reference electrode 15b. On the other hand, a measurement electrode 15d is formed to the outer side of the intermediate layer 15a, and a coating layer 15e, catalyst layer 15f, and trap layer 15g are layered proceeding to the outer side from the measurement electrode 15d. When exhaust gas is brought into contact with a downstream $O_2$ sensor 15 having this structure, the oxygen and oxide (for example, $NO_x$) in the exhaust gas are trapped in the trap layer 15g. The trapped oxygen and oxide migrate toward the inner side (the measurement electrode 15d side) of the downstream oxygen sensor 15 and arrive at the coating layer 15e after passing through the catalyst layer 15f. When this occurs, the oxide present in the exhaust gas is reduced by the catalytic function of the catalyst layer 15f to become oxygen. The oxygen that has reached the coating layer 15e comes into contact with the measurement electrode 15d while being held in the porous coating layer 15e. The downstream $O_2$ sensor 15 produces a voltage based on the difference between the concentration of the oxygen present in the vicinity of the measurement electrode 15d and the concentration of the oxygen gas that has been filled into the internal volume 15c (in the vicinity of the reference electrode 15b). This voltage is analyzed and is transmitted to the control section 30 as a signal that shows the downstream $O_2$ concentration.

F. The Control Section (ECU)

The control section (ECU) in the herein disclosed exhaust gas purification apparatus will now be described. The control section is composed mainly of a digital computer and functions as a control device for running the internal combustion engine and the exhaust gas purification apparatus. The control section has, for example, ROM, which is a read-only memory device; RAM, which is a readable-writable memory device; and a CPU, which carries out computations and evaluations.

The control section 30 in the structure shown in FIG. 1 is provided with input ports and is electrically connected to the sensors provided at various positions in the internal combustion engine 1 and the exhaust gas purification apparatus 100. As a result, the data acquired by the various sensors is transferred to the ROM, RAM, and CPU through these input ports as electrical signals. The control section 30 is also provided with output ports. Through these output ports, the control section 30 is connected to various positions on the internal combustion engine 1 and the exhaust gas purification apparatus 100 and controls the operation of the various members by the transmission of control signals.

The control section can estimate the air/fuel ratio (A/F) of the air-fuel mixture combusted by the internal combustion engine 1 based on the oxygen concentration, as detected by the upstream $O_2$ sensor, in the exhaust gas upstream from the exhaust gas purification catalyst. In addition, based on the oxygen concentration in the exhaust gas downstream from the exhaust gas purification catalyst 40, as detected by the downstream $O_2$ sensor, the control section can also estimate the exhaust gas air/fuel ratio of the exhaust gas that has passed through the exhaust gas purification catalyst.

Based on the detection results from the upstream $O_2$ sensor and the downstream $O_2$ sensor, the control section adjusts the air/fuel ratio of the air-fuel mixture that is supplied to the internal combustion engine. The control section of the herein disclosed exhaust gas purification apparatus adjusts the air/fuel ratio of the air-fuel mixture supplied to the internal combustion engine by carrying feedback control (F/B control). This F/B control is composed of main F/B control and sub-F/B control.

F-1. The Main F/B Control

In the main F/B control, the air/fuel ratio ($A/F_1$) of the air-fuel mixture being supplied to the internal combustion engine is calculated based on the upstream $O_2$ concentration that has been detected by the upstream $O_2$ sensor and a first control target value ($P_1$) is set based on this calculated air/fuel ratio and a predetermined target air/fuel ratio ($T_{A/F}$).

In the control section 30 of the exhaust gas purification apparatus 100 in the structure shown in FIG. 1, first the air/fuel ratio ($A/F_1$) of the air-fuel mixture currently being fed to the internal combustion engine 1 is calculated based on the upstream $O_2$ concentration detected by the upstream $O_2$ sensor 14. This calculated air/fuel ratio ($A/F_1$) is compared with the prescribed target air/fuel ratio ($T_{A/F}$) and the first control target value ($P_1$) is set so as to bring the air/fuel ratio of the air-fuel mixture supplied to the internal combustion engine 1 into proximity with the target air/fuel ratio ($T_{A/F}$). More specifically, when the calculated air/fuel ratio ($A/F_1$) is richer than the target air/fuel ratio ($T_{A/F}$), the control section 30 sets a first control target value ($P_1$) that has the effect of adjusting the air/fuel ratio of the air-fuel mixture to the lean side. When, on the other hand, the calculated air/fuel ratio ($A/F_1$) is leaner than the target air/fuel ratio ($T_{A/F}$), a first control target value ($P_1$) is set that has the effect of adjusting the air/fuel ratio of the air-fuel mixture to the rich side.

The target air/fuel ratio ($T_{A/F}$) is basically set in the vicinity of stoichiometry (A/F=14.7). Ideally, when the air/fuel ratio of the air-fuel mixture is adjusted based on the first control target value ($P_1$) set by the main F/B control as described above, the air/fuel ratio of the air-fuel mixture will be maintained at the target air/fuel ratio ($T_{A/F}$) and a stoichiometric exhaust gas, which is an exhaust gas for which the pollutant components are easily purified, is then supplied to the exhaust gas purification catalyst 40. However, a certain amount of error may be present in the detection value provided by the upstream $O_2$ sensor 14 and a certain amount of variability may also occur in the injection characteristics of the fuel injection valves 3. Furthermore, since an OSC material is present in the exhaust gas purification catalyst 40 in the herein disclosed exhaust gas purification apparatus 100, an air/fuel ratio control is required that considers the oxygen storage capacity due to this OSC material. The control section executes sub-F/B control in order to carry out an air/fuel ratio control that reflects the error in the upstream $O_2$ sensor 14, the variability in device operation, and the oxygen storage capacity of the exhaust gas purification catalyst 40.

F-2. The Sub-F/B Control

In the sub-F/B control, a second control target value ($P_2$) is set by correcting, based on the downstream $O_2$ concentration detected by the downstream $O_2$ sensor, the first control target value ($P_1$) set by the main F/B control as described above. Specifically, a correction based on the downstream $O_2$ concentration is performed in sub-F/B control on the first control target value ($P_1$), which is set considering, for example, the fuel combustion efficiency in the internal combustion engine, in order to set a second control target value ($P_2$) that considers the error in the upstream $O_2$ sensor 14, the variability in device operation, and the oxygen storage capacity of the exhaust gas purification catalyst 40.

A method in which the predetermined target air/fuel ratio ($T_{A/F}$) is adjusted based on the downstream $O_2$ concentration detected by the downstream $O_2$ sensor is a preferred aspect of this sub-F/B control. Specifically, in the sub-F/B control, the control section 30 adjusts the target air/fuel ratio ($T_{A/F}$) based on the downstream $O_2$ concentration and sets the second control target value ($P_2$) by correcting the first control target value ($P_1$) by comparing the post-adjustment target air/fuel ratio ($T_{A/F}$) and the first control target value ($P_1$). More specifically, the downstream $O_2$ concentration becomes lower than the upstream $O_2$ concentration when a lean exhaust gas is supplied to the exhaust gas purification catalyst 40 and oxygen in the exhaust gas is stored in the OSC material of the exhaust gas purification catalyst 40. In this case, the control section 30 adjusts the target air/fuel ratio ($T_{A/F}$) to the rich side and corrects the first control target value ($P_1$) based on this post-adjustment target air/fuel ratio ($T_{A/F}$). When, on the other hand, a rich exhaust gas is supplied to the exhaust gas purification catalyst 40 and the oxygen stored in the OSC material is released, the downstream $O_2$ concentration then becomes higher than the upstream $O_2$ concentration. In this case, the control section 30 adjusts the target air/fuel ratio ($T_{A/F}$) to the lean side and corrects the first control target value ($P_1$) based on this post-adjustment target air/fuel ratio ($T_{A/F}$). By doing this, a second control target value ($P_2$) is set that reflects, inter alia, the current air/fuel ratio of the air-fuel mixture and the oxygen storage capacity of the exhaust gas purification catalyst.

F-3. The Air/Fuel Ratio Adjustment Control

Here, the control section adjusts the air/fuel ratio of the air-fuel mixture supplied to the internal combustion engine based on the second control target value that has been set by the sub-F/B control as described above. Specifically, the control section 30 produces a control signal based on the second control target value ($P_2$) set by the sub-F/B control and transmits this control signal to the various devices in the internal combustion engine 1 that execute air/fuel ratio adjustment on the air-fuel mixture (for example, the fuel injection valves 3 and the throttle value 10). By doing this, the various devices operate to bring the air/fuel ratio of the air-fuel mixture to the second control target value ($P_2$) and an air-fuel mixture that reflects, inter alia, the current air/fuel ratio and the oxygen storage capacity of the exhaust gas purification catalyst is fed to the internal combustion engine 1.

Since according to the F/B control described above an air-fuel mixture control is performed that reflects the oxygen storage capacity of the exhaust gas purification catalyst, an exhaust gas tailored to the current oxygen storage capacity of the exhaust gas purification catalyst is fed to the exhaust gas purification catalyst. This makes it possible for the exhaust gas purification catalyst to carry out an excellent purification of the pollutant components in the exhaust gas. However, when excess rich exhaust gas continues to be released from the exhaust gas purification catalyst, oxygen is then no longer present at the periphery of the sensor element of the downstream $O_2$ sensor. Due to this condition, more oxygen is required, as compared to the case in which oxygen is present at the periphery of the sensor element, in order for the downstream $O_2$ sensor to produce a lean side output, and as a consequence a decline is produced in the responsiveness of the downstream $O_2$ sensor, which is a cause of control lag. During the time interval in which this control lag is being produced, an air-fuel mixture adapted to the state of the exhaust gas purification catalyst is not supplied, as a consequence of which the pollutant components cannot be thoroughly purified at the exhaust gas purification catalyst and pollutant component emission occurs.

However, as described above in the section "C-2-2. The OSC material", in the herein disclosed exhaust gas purification apparatus, an OSC material having a pyrochlore structure is present on the support in a prescribed region of the exhaust gas purification catalyst. Because this pyrochlore-structured OSC material has a slower oxygen storage rate than typical OSC materials, it can still store oxygen and can continue to release oxygen even when the oxygen stored in the other OSC material has reached a minimum and oxygen can no longer be released (refer to FIG. 5). Due to this, the appearance of a control lag in F/B control can be suppressed.

Figure 6:
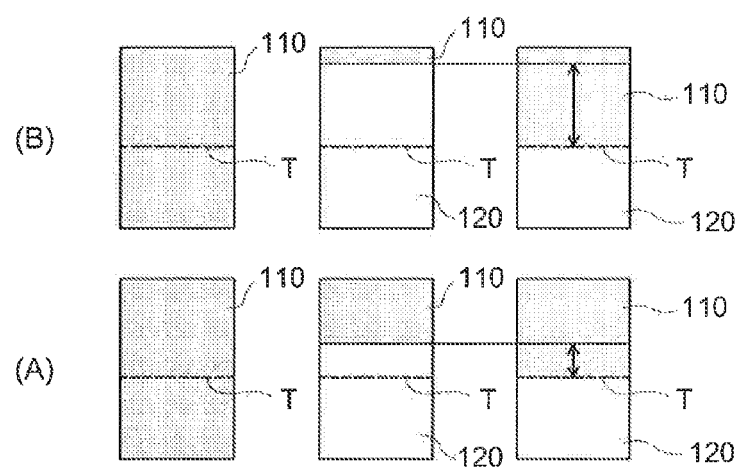

For example, FIG. 6 is a diagram that schematically shows the amount of oxygen present at the periphery of the downstream $O_2$ sensor. The shaded region 110 in FIG. 6 shows the amount of oxygen present at the periphery of the downstream $O_2$ sensor, while the white region 120 shows the value obtained by subtracting the amount of oxygen 110 present at the periphery of the downstream $O_2$ sensor from the oxygen capacity that can be present at the periphery of the downstream $O_2$ sensor. The dotted line shows the threshold T in order for the downstream $O_2$ sensor to produce a lean output. As shown in this FIG. 6, for the case (B) in which a conventional exhaust gas purification catalyst is used, when excess rich exhaust gas is supplied, the amount of oxygen 110 present at the periphery of the downstream $O_2$ sensor becomes small and as a consequence a large amount of oxygen (the arrow in FIG. 6) is required in order to exceed the threshold T for the lean output. This results in the appearance of a response lag by the downstream $O_2$ sensor. On the other hand, for the case (A) in which the herein disclosed exhaust gas purification catalyst is used, even when excess rich exhaust gas is supplied, the amount of oxygen 110 present at the periphery of the downstream $O_2$ sensor is larger than in the conventional case because a very small amount of oxygen continues to be released from the prescribed region of the exhaust gas purification catalyst as described above. As a consequence, when the exhaust gas fed to the downstream $O_2$ sensor switches to a lean exhaust gas, only a small amount of oxygen (the arrow in FIG. 6) is required to exceed the threshold T for the lean output. Accordingly, the response to the feed of lean exhaust gas is faster than for the conventional exhaust gas purification catalyst (B) and the appearance of a response lag in F/B control can be prevented. Thus, the herein disclosed exhaust gas purification apparatus, through its continuous use of the downstream $O_2$ sensor in a favorable sensitivity region, can suppress the appearance of a control lag in F/B control and can provide an excellent prevention of pollutant component emission.

Figure 7:
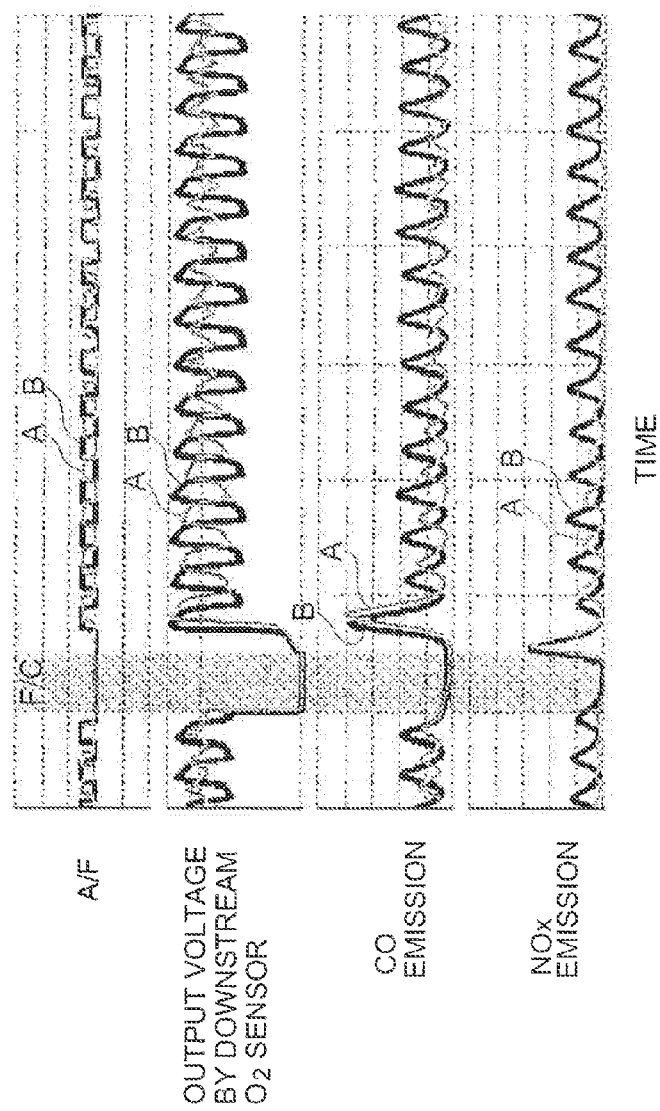
FIG. 7 is a chart that shows the change in the exhaust gas air/fuel ratio downstream from the exhaust gas purification catalyst as calculated based on the downstream $O_2$ sensor and also shows the change in the output voltage for the downstream $O_2$ sensor and the change in the amounts of carbon monoxide (CO) and nitrogen oxide ($NO_x$) emissions.

In addition, the herein disclosed exhaust gas purification apparatus makes possible a shortening of the response time of F/B control because it can be continuously used in a high sensitivity region without the appearance of large output fluctuations at the downstream $O_2$ sensor. As a consequence of this, a large frequency of execution is obtained for F/B control and an air-fuel mixture having a more favorable air/fuel ratio can be continuously supplied to the internal combustion engine. This result will be described with reference to FIG. 7, which is a chart that shows the fluctuations in the concentrations of various gases during the execution of F/B control. A in FIG. 7 refers to an exhaust gas purification apparatus that contains an OSC material having a pyrochlore structure in the support in a prescribed region of the exhaust gas purification catalyst, while B refers to an exhaust gas purification apparatus in which an OSC material not having a pyrochlore structure is present over the entire area of the exhaust gas purification catalyst. In both exhaust gas purification apparatuses A and B, there is a large fluctuation in the potential of the downstream $O_2$ sensor immediately after a fuel cut (F/C) and the emission of large amounts of CO and $NO_x$ is seen. However, in the case of the herein disclosed exhaust gas purification apparatus (A), the feed of excess rich exhaust gas to the downstream $O_2$ sensor is inhibited due to the slow oxygen storage rate in the prescribed region. As a consequence, the gradient of the potential fluctuation at the downstream $O_2$ sensor is relaxed and the potential fluctuation at the downstream $O_2$ sensor goes on to decline during the repetition of F/B control. Because, as a consequence, the air/fuel ratio of the air-fuel mixture can then be adjusted based on fine variations in the oxygen concentration, the CO and $NO_x$ emissions proceed to decline with elapsed time. In particular, in the chart in FIG. 7, in the interval in which the conventional exhaust gas purification apparatus (B) executes F/B control 15 times, the exhaust gas purification apparatus (A) according to an embodiment of the present invention executes F/B control 18 times. As a consequence, a further suppression of pollutant component emission is obtained because the air/fuel ratio of the air-fuel mixture is subjected to a finer and more precise adjustment. For example, with the exhaust gas purification apparatus shown by A in FIG. 7, the $NO_x$ emission approaches 0 after the 6th execution of F/B control.

In addition, in the herein disclosed exhaust gas purification apparatus, OSC material having a pyrochlore structure and OSC material having a faster oxygen storage rate than this OSC material having a pyrochlore structure are present in the support in a prescribed region from the catalyst-outlet-side end at the downstream side of the exhaust gas purification catalyst. Thus, in the herein disclosed exhaust gas purification apparatus, an OSC material having a fast oxygen storage rate and an OSC material having a slow oxygen storage rate coexist in this prescribed region. Accordingly, since a purification function sufficient to achieve a favorable purification of the pollutant components in the exhaust gas can also be exhibited in the prescribed region, a favorable purification of the pollutant components can be achieved in the prescribed region even when a large flow rate exhaust gas is supplied to the exhaust gas purification catalyst and pollutant components reach the prescribed region. As a result, the herein disclosed exhaust gas purification apparatus can provide an excellent prevention of the pollutant component emission that can be produced by disposing the OSC material having a slow oxygen storage rate in the prescribed region.

Preferred embodiments of the present invention have been described in the preceding. Examples relating to the invention will now be described in the following, but there is no intent for the present invention to be limited to the examples described below.

EXAMPLE 1

Five CZ complex oxides were first prepared (samples 1 to 5); these contained two types of crystalline structures, the pyrochlore structure and the fluorite structure, and had different proportions of these crystalline structures. X-ray diffraction analysis was carried out in order to identify the crystalline structures in each sample, and the value $I_{14}/I_{29}$ was determined by dividing the intensity $I_{14}$ of the maximum peak yielded by this X-ray diffraction analysis by the intensity $I_{29}$ of the maximum peak. The results of these determinations are given in Table 1.

TABLE 1

|  | 1 | 2 | 3 | 4 | 5 |
|---|---|---|---|---|---|
| $I_{14}/I_{29}$ | 0.01 | 0.028 | 0.045 | 0.047 | 0.048 |
| reserve amount of OSC | 0.018 | 0.035 | 0.04 | 0.05 | 0.045 |

As shown in Table 1, the $I_{14}/I_{29}$ of the CZ complex oxide of sample 1 was 0.01. The $I_{14}/I_{29}$ of sample 2 was 0.028. The $I_{14}/I_{29}$ of sample 3 was 0.045. The $I_{14}/I_{29}$ of sample 4 was 0.047. The $I_{14}/I_{29}$ of sample 5 was 0.048.

(Measurement of the Reserve Amount of OSC)

Sample 1, 2, 3, 4, or 5 was introduced into a container and a thorough oxygen storage into the particular sample was performed by feeding a mixed gas of oxygen gas and nitrogen gas (1% oxygen concentration) into this container for 180 seconds at a total flow rate of 10 L/min. Release of the oxygen from the sample was brought about by feeding a mixed gas of carbon monoxide gas and nitrogen gas (2% carbon monoxide concentration) at a total flow rate of 10 L/min to the particular oxygen-loaded sample and the carbon monoxide was oxidized to carbon dioxide. The amount of carbon dioxide discharged from the container from 10 seconds after the start of the carbon monoxide gas feed to 120 seconds after the start of the carbon monoxide gas feed was measured as the amount of oxygen released. Because 1 mole of oxygen is required to convert 1 mole of carbon monoxide to carbon dioxide, the number of moles of carbon dioxide measured is taken to be the number of moles of oxygen released from the particular sample. The reserve amount of OSC was calculated as the value yielded by dividing the cumulative value for the number of moles of oxygen measured as described above (number of moles of carbon dioxide) (mol-$O_2$) by the number of moles of cerium (mol-Ce) present in the particular sample. The results of these measurements are given in FIG. 8.

Figure 8:
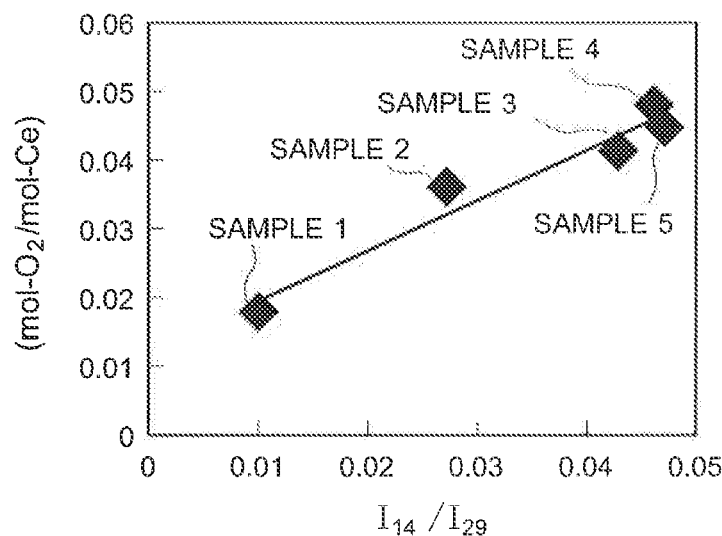
FIG. 8 is a graph that shows the peak intensity ratio ($I_{14/29}$) and the reserve amount of OSC (mol-$O_2$/mol-Ce) for samples 1 to 5.

As shown in FIG. 8, after 10 seconds of exposure to carbon monoxide, a larger amount of oxygen release was obtained at a larger $I_{14}/I_{29}$ value (=a larger content of the pyrochlore structure). That is, this example demonstrated that an OSC material containing larger amounts of the pyrochlore structure had a slower oxygen storage rate (larger reserve amount of OSC) and gave a greater inhibition of depletion of the stored oxygen even during long-term exposure to a rich exhaust gas.

EXAMPLE 2

Five types of OSC materials having different specific surface areas (samples 6 to 10) were then prepared and the amount of oxygen storage was measured on these OSC materials.

(Sample 6)

A CZ oxide having an $I_{14}/I_{29}$ value of 0.048 and a BET specific surface area of 1 m²/g (i.e., the same CZ oxide as sample 5) was used for sample 6.

(Sample 7)

A CZ oxide having an $I_{14}/I_{29}$ value of 0.01 and a BET specific surface area of 5 m²/g (i.e., the same CZ oxide as sample 1) was used for sample 7.

(Sample 8)

A CZ oxide having an $I_{14}/I_{29}$ value of 0 (i.e., the pyrochlore structure was not present) was prepared as sample 8. The BET specific surface area of this sample was 23 m²/g.

(Sample 9)

A CZ oxide having an $I_{14}/I_{29}$ value of 0 (i.e., the pyrochlore structure was not present) was prepared as sample 9. The BET specific surface area of this sample was 45 m²/g.

(Sample 10)

A CZ oxide having an $I_{14}/I_{29}$ value of 0 (i.e., the pyrochlore structure was not present) was prepared as sample 10. The BET specific surface area of this sample was 50 m²/g.

(Measurement of the Proportion of Reserve OSC)

Figure 9:
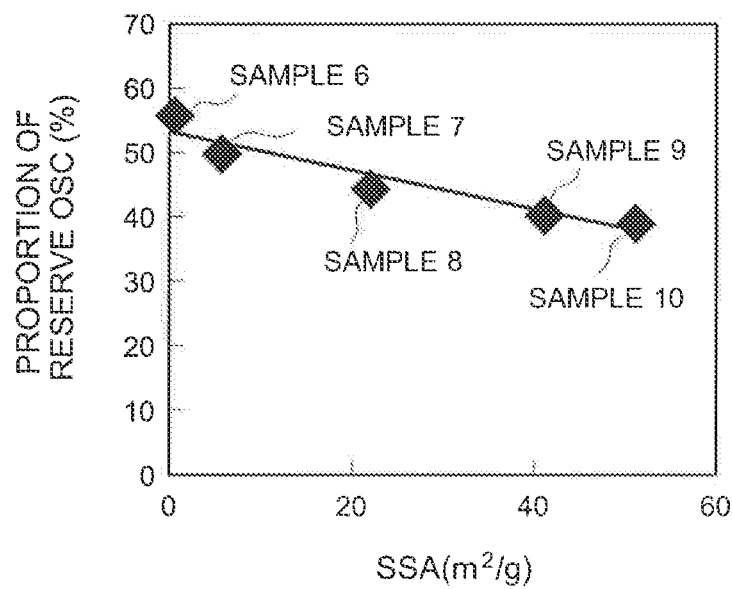
FIG. 9 is a graph that shows the specific surface area and the proportion of reserve OSC (%) for samples 6 to 10.

After oxygen storage had been carried out on samples 6 to 10 as in "Measurement of the reserve amount of OSC", supra, carbon monoxide gas was supplied and the amount of carbon dioxide discharged from the container from 10 seconds after the start of the feed to 120 seconds after the start of the feed was measured as the amount of oxygen released. As shown in FIG. 9, in this case the "proportion of reserve OSC (%)", which is the percentage expression of the value obtained by dividing the measured amount of oxygen released by the amount of oxygen released from 0 seconds after the start of the feed to 10 seconds after the start of the feed, is used as the index.

As shown in FIG. 9, samples with smaller specific surface areas had larger proportions of reserve OSC. Thus, it was shown that a smaller specific surface area for the OSC material gave a slower oxygen storage rate (larger proportion of reserve OSC) and a better resistance to depletion of the stored oxygen even during long-term exposure to a rich exhaust gas. Furthermore, it was shown that OSC materials having very small specific surface areas, i.e., of not more than 10 m²/g, were obtained with the CZ oxides in samples 6 and 7, which contained large amounts of pyrochlore structure as indicated by $I_{14}/I_{29}>0.01$.

EXAMPLE 3

Exhaust gas purification apparatuses (samples 11 to 14) were prepared that were equipped with exhaust gas purification catalysts having 4 different structures, and the exhaust gas purification capacity of each exhaust gas purification apparatus was evaluated. Samples 11 to 14 used exhaust gas purification catalysts 40 with different structures in the exhaust gas purification apparatus 100 with the structure shown in FIG. 1. The structures of the exhaust gas purification catalysts 40 in samples 11 to 14 are described in the following.

(Sample 11)

Sample 11 used an exhaust gas purification catalyst 40 that was provided with a catalyst layer 43 in which palladium (Pd) was supported as the metal oxide over the entire area of a support that contained CZ oxide as the OSC material in alumina, a porous metal oxide. The CZ oxide in sample 11 did not contain the pyrochlore structure ($I_{14}/I_{29}=0$).

(Sample 12)

In sample 12, the average particle size of the Pd supported in the back region 45 of the catalyst layer 43 of the exhaust gas purification catalyst 40 was brought to ¹⁄₄₀ of the average particle size of the Pd used in sample 11 and the average particle size of the Pt, which was supported in the region (the upstream region of the exhaust gas purification catalyst) 44 outside the back region 45, was made the same as the Pd used in sample 11. The structure was otherwise the same as in sample 11.

(Sample 13)

In sample 13, the amount of Pd supported in the back region 45 of the catalyst layer 43 of the exhaust gas purification catalyst 40 was brought to ½ of the amount of Pd supported in sample 11. The structure was otherwise the same as in sample 11.

(Sample 14)

In sample 14, both a CZ oxide having a pyrochlore structure and a CZ oxide having a fluorite structure were present in the catalyst layer 43 of the exhaust gas purification catalyst 40. The structure was otherwise the same as in sample 11.

(Evaluation of the Exhaust Gas Purification Capacity)

The exhaust gas purification apparatus 100 was run for 5 minutes under F/B control and the amount of $NO_x$ emission was measured during this running period. This evaluation was performed divided into the following modes: a mode in which exhaust gas was supplied (10 g/second) at a low air intake amount and a mode in which exhaust gas was supplied at a large flow rate (30 g/second). The results for the supply of the low flow rate exhaust gas are given in FIG. 10 and the results for the supply of the large flow rate exhaust gas are given in FIG. 11. The "$NO_x$ emission exhaust ratio" in FIGS. 10 and 11 is the value of the amount of $NO_x$ emission for the particular sample when the amount of $NO_x$ emission for sample 11 is made 1.0.

Figure 10:
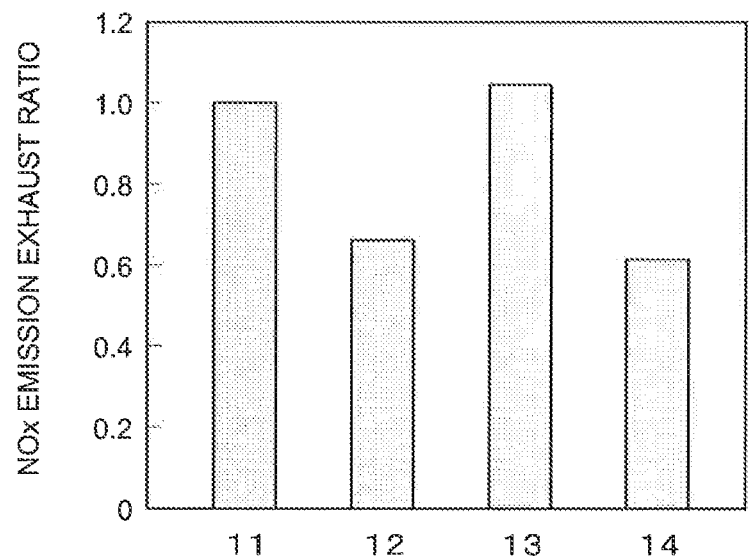
FIG. 10 is a graph that shows the $NO_x$ emission ratio for samples 11 to 14 for an air intake amount of 15 g/second.

As shown in FIG. 10, when the low flow rate exhaust gas was supplied, samples 12 and 14 provided lower amounts of $NO_x$ emission than did the other samples. That is, it was shown that, when the exhaust gas had a low flow rate, the amount of $NO_x$ emission could be brought down by having an OSC material with a slow oxygen storage rate be present on the support. This is understood to be due to a suppression of the feed of excess rich exhaust gas to the downstream $O_2$ sensor 15 and the prevention of the control lag in F/B control.

Figure 11:
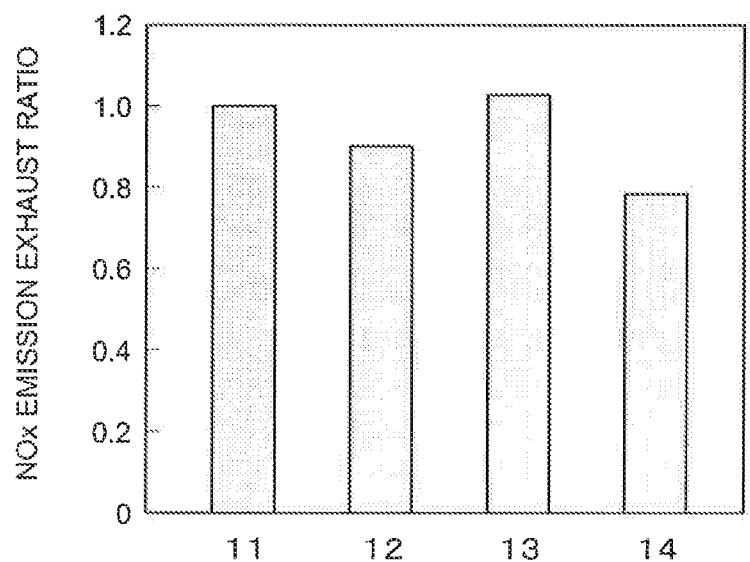
FIG. 11 is a graph that shows the $NO_x$ emission ratio for samples 11 to 14 for an air intake amount of 30 g/second.

On the other hand, as shown in FIG. 11, when a high flow rate exhaust gas was supplied, the amount of $NO_x$ emission was increased with sample 12 and a good reduction in the amount of $NO_x$ emission occurred only with sample 14. This is understood to be due to the ability to exhibit a favorable exhaust gas purification capacity, notwithstanding the use of an OSC material with a slow oxygen storage rate, due to the coexistence in sample 14 of an OSC material with a slow oxygen storage rate and an OSC material with a fast oxygen storage rate. It was thus shown that an excellent prevention of pollutant component emission could be obtained by having both an OSC material having a pyrochlore structure and an OSC material having a faster oxygen storage rate than the OSC material having a pyrochlore structure, be present in the support in the prescribed region in the catalyst layer.

In addition, sample 13, in which the amount of Pd supported in the back region was made half that of the other samples, was unable to restrain the amount of $NO_x$ emission. From this it can be understood that the method of adjusting the supported amount of the precious metal catalyst is unable to bring about the coexistence of an OSC material having a fast oxygen storage rate and an OSC material having a slow oxygen storage rate in the back region of the catalyst layer.

INDUSTRIAL APPLICABILITY

The herein disclosed deterioration detection method and exhaust gas purification apparatus can provide an excellent prevention of both the emission of pollutant components that is due to a control lag in F/B control and the emission of pollutant components that is produced by the use in order to eliminate this control lag of an OSC material having a slow oxygen storage rate. Thus, the present invention simultaneously solves two contradictory problems, i.e., the control lag in F/B control and the adverse effects due to the use of an OSC material having a slow oxygen storage rate, and is an important art that can substantially reduce the emission of pollutant components and can make a major contribution to industrial growth and development.

The invention claimed is:

1. An exhaust gas purification apparatus that is disposed in an exhaust system of an internal combustion engine and that purifies an exhaust gas, the exhaust gas purification apparatus comprising:
    an exhaust gas purification catalyst that is disposed in the exhaust system and that has a catalyst layer formed on a substrate and including a support containing an OSC material having an oxygen storage capacity and a precious metal catalyst supported on this support;
    an upstream $O_2$ sensor that is disposed in the exhaust system upstream from the exhaust gas purification catalyst and that detects an upstream $O_2$ concentration, which is an oxygen concentration in the exhaust gas on the upstream side of the exhaust gas purification catalyst;
    a downstream $O_2$ sensor that is disposed in the exhaust system downstream from the exhaust gas purification catalyst and that detects a downstream $O_2$ concentration, which is an oxygen concentration in the exhaust gas on the downstream side of the exhaust gas purification catalyst; and
    a control section that is configured to be capable of executing main feedback control that calculates an air/fuel ratio for an air-fuel mixture being supplied to the internal combustion engine based on the upstream $O_2$ concentration and that sets a first control target value based on the calculated air/fuel ratio and a predetermined target air/fuel ratio, sub-feedback control that sets a second control target value by correcting the first control target value based on the downstream $O_2$ concentration, and air/fuel ratio adjustment control that adjusts the air/fuel ratio of the air-fuel mixture supplied to the internal combustion engine based on the second control target value,
    wherein the support in a prescribed region from a catalyst-outlet-side end at the downstream side of the exhaust gas purification catalyst contains the OSC material, wherein the OSC material comprises a first OSC material having a pyrochlore structure and a second OSC material having an oxygen storage rate that is faster than that of the first OSC material having a pyrochlore structure,
    wherein the second OSC material has a fluorite structure.

2. The exhaust gas purification apparatus according to claim 1, wherein a length, in the exhaust gas flow direction, of the prescribed region from the catalyst-outlet-side end is from 10% to 50% of a total length of the catalyst layer of the exhaust gas purification catalyst.

3. The exhaust gas purification apparatus according to claim 1, wherein the downstream $O_2$ sensor is a ceramic oxygen sensor in which an intermediate layer formed of an oxide conductor is sandwiched between a measurement electrode and a reference electrode and in which a porous coating layer made of a metal oxide is formed on the measurement electrode.

4. The exhaust gas purification apparatus according to claim 1, wherein a specific surface area based on the BET method of the OSC material having a pyrochlore structure is not more than 10 $m^2/g$.

5. The exhaust gas purification apparatus according to claim 1, wherein both the OSC material having a pyrochlore structure and the OSC material having a faster oxygen storage rate than the OSC material having a pyrochlore structure are a ceria-zirconia complex oxide.

6. The exhaust gas purification apparatus according to claim 1, wherein in the sub-feedback control, the control section sets the second control target value by adjusting the target air/fuel ratio based on the downstream $O_2$ concentration and correcting the first control target value by comparing this post-adjustment target air/fuel ratio with the first control target value.

* * * * *